Nov. 11, 1952     A. M. JOZEFCZYK     2,617,420
EAR CLEANING DEVICE
Filed Oct. 25, 1951
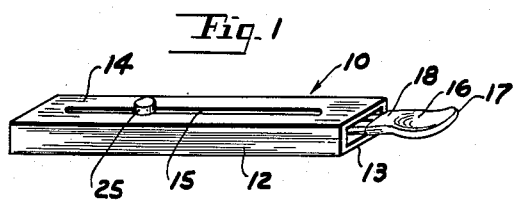
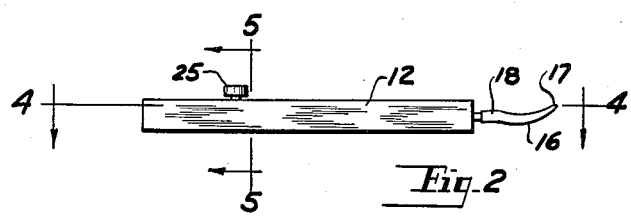
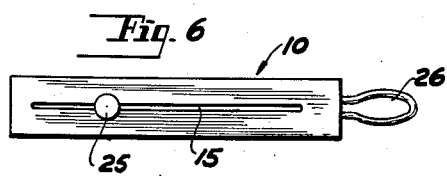
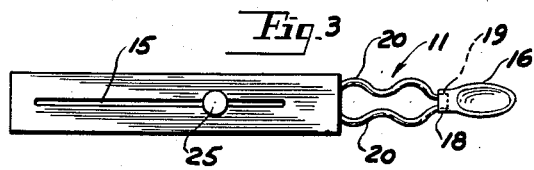
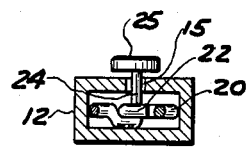
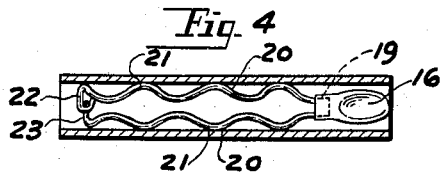
INVENTOR.
ANDREW M. JOZEFCZYK.
BY Louis Chayka
ATTORNEY.

Patented Nov. 11, 1952

2,617,420

UNITED STATES PATENT OFFICE 2,617,420

EAR CLEANING DEVICE

Andrew M. Jozefczyk, Detroit, Mich.

Application October 25, 1951, Serial No. 253,077

2 Claims. (Cl. 128—304)

My improvement pertains to a device adapted to clear the outer ear canal of accumulations of wax extruded by the surface tissues thereof. My specific object is to provide a device including means to prevent excessive pressure on the tissues of the canal, the means being responsive and yielding automatically to such pressure.

I shall now describe my improvement with reference to the accompanying drawing in which:

Fig. 1 is a perspective view of my ear cleaning device;

Fig. 2 is a side elevational view thereof;

Fig. 3 is a plan elevational view of the device, the view disclosing a movable element in a partly outwardly-extended position;

Fig. 4 is a sectional view on line 4—4 of Fig. 2;

Fig. 5 is a sectional view on line 5—5 of Fig. 2;

Fig. 6 is a plan elevational view of a modified species of my device;

Fig. 7 is an enlarged perspective view of one end portion of the movable element of the device shown in Fig. 6.

Similar numerals refer to similar parts throughout the several views.

Generally, my device comprises a casing 10 and a movable element 11. The casing has the shape of a flat, rectangular box oblong in form and open at least at one end, as shown in Fig. 1, said casing including side walls 12, a broad bottom wall 13, and a top wall 14 in a parallel relation to said bottom wall. The top wall is provided with a long slot 15 extending midway said top wall in the direction of the length of said casing. The movable element 11 includes a shell-like spoon 16, the tip portion 17 thereof extending above the main level of said spoon. The spoon may be made of metal or plastic and is of a size permitting its insertion into the outer ear of a person, that is, into the auricle and the meatus, for the purpose of removing therefrom waxy excretions accumulated therein.

For the sake of efficiency and safety in manipulation of the spoon, the latter has been designed so as to avoid any points or sharp edges. The shank 18 of the spoon includes a socket 19 for reception of two legs 20. These are made of wire, being spaced from each other and having a spring-like tendency to diverge from each other. Each of the legs shows lateral undulations or waves, the crests 21 of which are in a frictional contact with the side walls 12 of the casing, as best shown in Fig. 4. One of the legs terminates with a loop 22, the loop enclosing the outer end 23 of the adjoining leg, said outer end 23 being turned at right angle to the plane of its undulations, as shown at 24, and extending outwardly of the casing through said slot 15. Mounted on top of said outer end 23 is a knob 25.

The device shown in Figs. 6 and 7 includes a modified movable element, the element being made of a wire turned upon itself in a hairpin turn to form a loop 26 and two legs 28. The loop, which is equivalent to the above-described spoon 16, includes a tip portion 27 curved away from the plane of said legs 28. The latter are crimped to show undulations or waves in the manner disclosed in legs 20. One of the legs, at its free end, is looped about the end of the other leg, the latter supporting a knob in the manner already shown in Figs. 4 and 5.

As will be seen from the above description, the movable member within the casing may have the outline of a hairpin including a looped end and two legs resiliently diverging from each other or said movable member may have a shell-like spoon, preferably oval in shape, and two wire legs affixed to the shank portion of said spoon, the legs being similarly in a resiliently divergent relation to each other.

Normally the movable element is entirely concealed within the casing of the device. When it is desired to apply the device operatively, the movable element is shifted outwardly of said casing by means of knot 25 to the limit permitted by slot 15, or to a lesser distance. While the casing is held in the hand, the operative end of the movable member may be inserted into the ear. When the movable element is in its extended position its two legs are in a yielding frictional contact with the side walls of said casing. Should the operative end of the movable member be applied to the inner surface of the ear with undue force, the encounter, even though slight, would easily overcome the frictional engagement of the legs with the inner surface of the casing so that the movable element as a whole would be pushed inwardly into the casing. This would eliminate the possibility of any injury to the delicate surface tissues of the ear canal in which the spoon was being used.

It will be understood that some changes may be made in the structural design of my device without departing from the inventive principle disclosed herein.

What I, therefore, wish to claim is as follows:

1. An ear cleaning device as described, said device comprising an oblong casing open at one end and being provided with a longitudinal slot in its wall, a hairpin-shaped wire member including a looped end and, two resiliently diverging legs said looped end being normally disposed within the casing at the open end thereof and said legs normally extending up to the opposite end of said casing, a knob outside the casing, the knob being connected to said hairpin-shaped wire member through said slot and serving as a means to shift said member endwise to expose the looped end thereof, the legs being undulated for a sliding frictional contact with the inner surface of the casing.

2. An ear cleaning device comprising an oblong casing having a flat top, a flat bottom, and two side walls, said casing being provided with an oblong slot in its top, a movable member normally concealed within the casing and including at the open end thereof a substantially oval-shaped element adapted to be inserted into the ear of a person for removal of waxy excretions therefrom, said movable member including two wire legs extending from said oval member towards the opposite end of said casing, the legs diverging from each other laterally for a yieldable, frictional contact with the inner surfaces of said side walls, a knob outside the casing and connected to said movable member through said slot for a manual shift of the oval-shaped member outwardly beyond the open end of the casing.

ANDREW M. JOZEFCZYK.

REFERENCES CITED

The following references are of record in the file of this patent:

UNITED STATES PATENTS

| Number | Name | Date |
|---|---|---|
| 2,569,237 | Hall | Sept. 25, 1951 |

FOREIGN PATENTS

| Number | Country | Date |
|---|---|---|
| 96,782 | Switzerland | Nov. 16, 1922 |